United States Patent Office 2,902,106
Patented Sept. 1, 1959

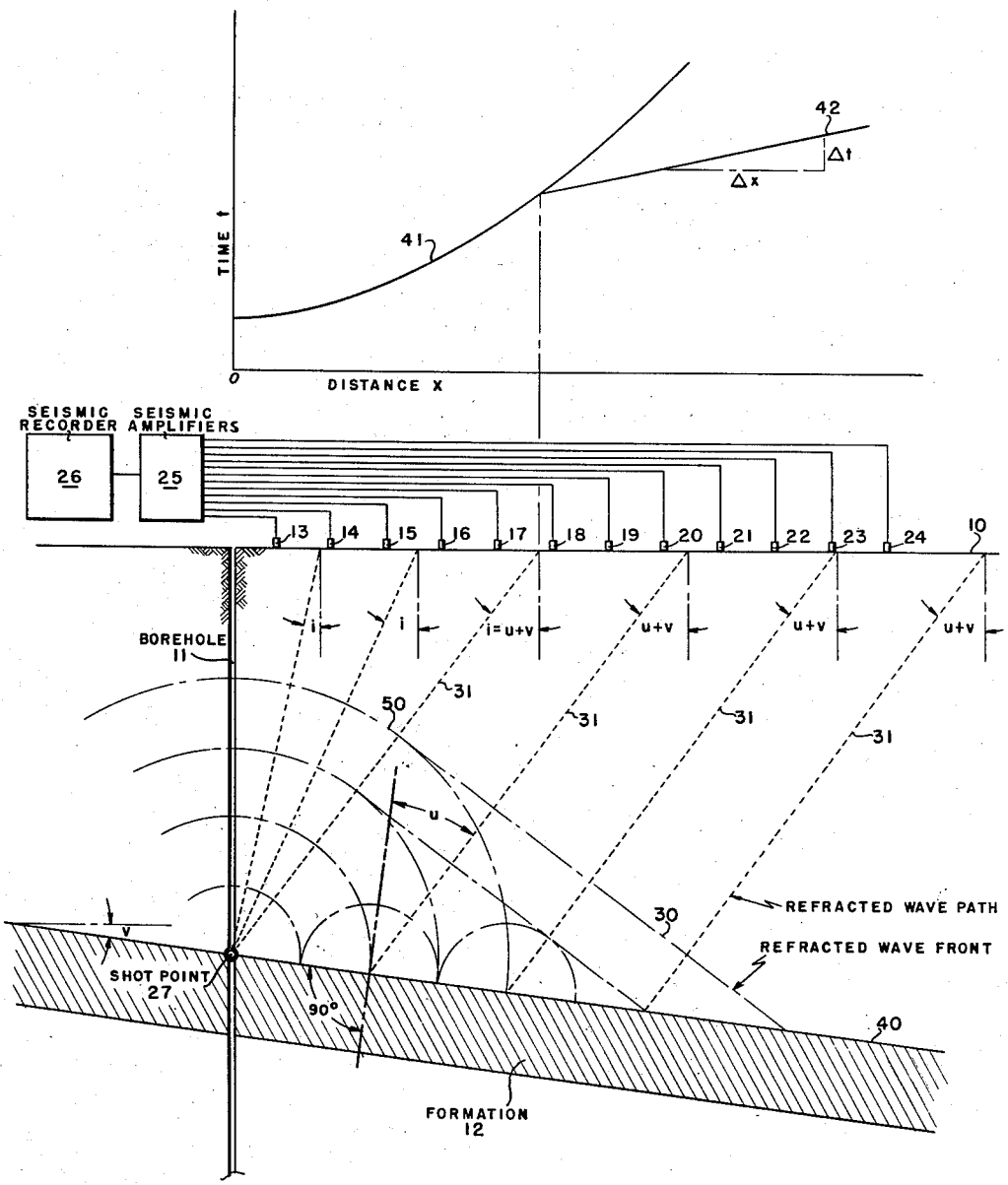
INVENTORS.
Charles H. Carlisle,
Tobias Flatow,
BY Frank S. Troidl
ATTORNEY.

2,902,106

METHOD OF DETERMINING THE DIP OF GEOLOGIC FORMATIONS IN THE VICINITY OF A BOREHOLE

Charles H. Carlisle and Tobias Flatow, Houston, Tex., assignors, by mesne assignments, to Jersey Production Research Company, Tulsa, Okla., a corporation of Delaware Application December 8, 1955, Serial No. 551,825

4 Claims. (Cl. 181—.5)

This invention relates to a new and novel method for determining the dip of a particular subsurface formation. More particularly this invention relates to a method of determining the dip of a relatively high velocity subsurface formation which has been traversed by a borehole.

One purpose of geophysical prospecting is to obtain a conception of the nature of the subsurface structure. In order to obtain an idea of the subsurface structure it is necessary to ascertain the depth of particular formations directly below a particular point of the surface of the earth. It is also necessary that the dip of each formation be known. From a knowledge of such factors as the depth and dip of particular formations in the subsurface, a map in cross-section can be made of the subsurface structures and studied by geologists with a view toward determining whether or not the subsurface structure is such as to be conducive to the presence of valuable minerals such as oil.

Our new method is a new and novel method for determining the dip of a particular formation, which formation has elasticity and density characteristics such as to transmit seismic waves at a higher velocity than the subsurface formations located between the particular subsurface formation and the surface of the earth. The new method consists broadly in locating the uppermost interface of the relatively high velocity subsurface formation; placing a seismic generating means adjacent the high velocity formation and detecting, at a plurality of spaced points on the surface of the earth, the seismic waves propagated through the earth. The detected seismic waves are recorded. From an examination of the record the dip of the particular high velocity subsurface formation can be ascertained.

Our new method for determining the dip of a particular subsurface formation has certain advantages over the regular refraction shooting method. In regular refraction shooting the pickups extend over a very large area (often as much as a mile or two). In carrying out our new method the area is cut in half as pickup coverage is necessary on only one side of the borehole, and also this coverage is closer to the borehole. This is a significant operational advantage. Also because the seismic waves are initiated in the vicinity of the subsurface formation rather than at the surface of the earth as a regular refraction shooting, the travel of the refracted wave is cut in about half, hence are less attenuated and, therefore, seismic events on the record are much more distinct and accurate, making possible accurate "picks" and hence accurate results. Also the computation of dip is easier if our new method for determining the dip of relatively high velocity subsurface formations is utilized.

Other objects and a fuller understanding of the invention may be had by referring to the following description and claims, taken in conjunction with the accompanying drawing which shows a vertical cross-section of the subsurface and also shows a time-distance plot such as might be obtained in carrying out our new method.

Referring to the drawing, numeral 10 represents the surface of the earth into which has been drilled a borehole 11. In carrying out our new method the location of a high velocity formation such as that shown at 12 in the drawing is determined. Recently a velocity logging device has been developed with which one can locate the interface of two subsurface formations, having different velocity transmission characteristics, with great accuracy. The logging device is described in a patent application entitled "Seismic Velocity Well Logging Apparatus," Serial No. 344,134, filed March 23, 1953.

Placed upon the surface of the earth 10 at a plurality of spaced apart points is an in-line array of geophones indicated by the numerals 13 through 24, inclusive. Any seismic waves propagated through the earth and detected by the geophones 13 through 24, inclusive, result in the generation of an electrical signal from each of the geophones which in amplitude and frequency correspond to the detected seismic waves. The generated electrical signals are conducted to seismic amplifiers 25, amplified, and recorded on recorder 26.

After the uppermost interface of the formation 12 has been determined by the velocity logger, a means 27 for initiating a disturbance is lowered into the borehole 11 to a point within borehole 11 adjacent the uppermost interface of the formation 12. The means for causing the disturbance may consist of any one of a plurality of well known means for causing seismic disturbances such as a primacord or some device such as a perforating gun or any type of transducer capable of creating a large enough disturbance. Some of the seismic waves generated from element 27 will form spherical wave fronts 50 which are propagated through the formations located above formation 12. As the expanding wave in the formation 12 moves outward it starts a new disturbance at each point along the interface 40 in the upper medium. The resulting infinitely numbered spherical disturbances integrate into a straight-line refracted wave front 30. The refracted straight-line wave front 30 will follow a path such as that shown at 31 and be detected by the geophones located at the earth's surface. The ray paths 31 are parallel straight lines and all make an angle $u$ with a perpendicular line drawn to the interface 40 if formation 12 has no dip. If the formation 12 is dipping from the horizontal along the geophone array by an angle $v$, the emergence angle $i$ of the refracted wave paths will all equal $u+v$. The emergence angle is defined as the angle between a straight-line wave path emerging at the earth's surface and the perpendicular to the earth's surface.

Hence, the wave front that impinges the earth's surface is curved in the section nearest the borehole 11, and straight in the other section. The different rays corresponding to the curved section 50 emerge to the surface at different "emergence angles" but the rays corresponding to the straight refracted wave front 31 all emerge with the same emergence angle $i=u+v$. The resulting seismic event on a record will follow a time-distance curve as shown; the abscissa is calibrated in terms of the distance of the geophones 13 through 24, inclusive, from the borehole 11 and the ordinate is calibrated in terms of the time it takes for a seismic wave to be propagated from the seismic generating means 27 to each of the geophones 13 through 24, inclusive. The early section of the curve such as shown at 41 is hyperbolic, the later section of the curve such as shown at 42 will be a substantially straight line.

The angle of dip $v$ can be determined from the formulas $$\frac{\Delta t}{\Delta x} = \frac{\sin(u+v)}{V_1}$$

and $$\sin u = \frac{V_1}{V_2}$$

$$\frac{\Delta t}{\Delta x}$$

can be obtained from the slope of the time distance curve; and $V_1$ and $V_2$ can be obtained from the velocity log.

Consider a typical numerical example. Assume that at 5000 feet the velocity logger delineated a formation whose velocity $V_2$ is 12,000 feet per second compared to say a velocity $V_1$ of 8000 feet per second for the formation above it. Velocity changes of the magnitude of 50 percent are not unusual but changes of as low as 20 to 30 percent would be adequate for the application of this method. So in this example $$u = \sin^{-1} \frac{8000}{12,000} = 41°50'$$

A shot is fired at the interface 40 in the borehole and a time-distance curve established from the record obtained from seismic recorder 26. If the slope $$\frac{\Delta t}{\Delta x}$$

of the resultant time distance curve is found to be $$\frac{1}{9560}$$

then according to the above equation $$\frac{1}{9560} = \frac{\sin(41°50' + v)}{8000}$$

or $v = 15°$, which is the dip of the formation 12 in the direction of the pickup spread 13 through 24, inclusive.

In order for the true dip of formation 12 to be accurately determined it is necessary that formation 12 be thick enough for waves propagated therethrough to set up new disturbances at points along the interface 40. One hundred feet or so thickness is sufficient.

To get the true dip of subsurface formation 12 a separate recording is made with the pickups arrayed in a different azimuthal direction, preferably 90° apart from the azimuthal direction of the first array. From each recording the value of dip in the corresponding azimuthal direction (called apparent dip) is determined, and from these two values of apparent dip the direction and amount of true dip are determined.

It has been assumed for simplicity that only one formation exists above the high velocity layer 12. Actually the $V_1$ velocity might be an average for several low velocity formations, the only limitation in practicing our new method being that no formation exists above the formation 12 whose velocity equals or exceeds $V_2$.

In the foregoing discussion it was assumed that the means for generating the seismic disturbances is in the borehole and that the geophones are on the surface of the earth. However, if desired, a geophone can be placed at a point within the borehole adjacent the interface 40 of subsurface formation 12 and seismic waves sequentially iniated at various stations on the surface 10, and the same results obtained. In accordance with the theorem of reciprocity the seismic waves are initiated separately at the various points on the earth's surface and the time required for transmission of first arrivals from each shot point to the geophones is in order to obtain data for the time of transmission vs. distance $x$ curve described above with reference to the drawing. Manifestly, the ray-paths will be the same for both directions of transmission from a given shot point to the intersection of the borehole with the interface of interest.

Although we have described our invention with a certain degree of particularity, it is understood that the present disclosure has been made only by way of example and that numerous changes in the method may be resorted to without departing from the spirit and the scope of the invention as hereinafter claimed.

What we wish to claim as new and useful and to secure by Letters Patent is:

1. A method of obtaining the dip of a particular subsurface formation traversed by a borehole, said formation having an elasticity and density such that the velocity of seismic waves therein are greater than the velocity of seismic waves in the subsurface formations located above said particular subsurface formation comprising: making a velocity log of said borehole to locate the interface of said particular subsurface formation and to determine said velocity ($V_2$) of seismic waves through said particular subsurface formation and the average velocity ($V_1$) of seismic waves through earth formations above said particular earth formation; creating seismic waves originating at the intersection of said borehole and said interface; detecting said seismic waves at a plurality of in-line spaced apart detection points on the surface of the earth and generating electric signals from each of said points corresponding in amplitude and frequency to the amplitude and frequency of the detected seismic waves; recording said generated electric signals; from the recording of said generated electric signals, determining the time of transmission of first arrivals of said seismic waves to each of said detecting points; plotting a curve of time of transmission to each of said detecting points as a function of distance of said detecting points from said borehole; and determining the angle of dip from the formulae:

$$\sin u = \frac{V_1}{V_2}$$

and $$\frac{\Delta t}{\Delta x} = \frac{\sin(u+v)}{V_1}$$

where $$\frac{\Delta t}{\Delta x}$$

is the slope of said curve, $v$ is said angle of dip, and $u+v$ is the angle of emergence from the earth of seismic waves refracted from said interface.

2. A method of obtaining the dip of a selected earth formation traversed by a borehole which has an elasticity and density such that the velocity of seismic waves therein is greater than the velocity of seismic waves in the subsurface formations located above said particular subsurface formation comprising: making a velocity log of said borehole to locate the interface of said particular subsurface formation and to determine said velocity ($V_2$) of seismic waves through said particular subsurface formation and the average velocity ($V_1$) of seismic waves through earth formations above said particular earth formation; utilizing a seismic wave generating means and a seismic wave detecting means by placing one of said means within the borehole at the intersection of said borehole and said interface, and placing the other of said means on the surface of the earth with said other of said means positioned at a plurality of locations on the surface of the earth, and utilizing said generating means to pick up created seismic waves which are propagated through the earth and detected by said detecting means; recording electric signals generated by said detecting means having an amplitude and frequency corresponding to the amplitude and frequency of the detected seismic waves; from the recording of said generated electric signals, determining the time of transmission of first arrivals of said seismic waves between said generating means and said detecting means; plotting a curve of time of transmission as a function of distance of said other of said means from said borehole; and determining the angle of dip from the formulae:

$$\sin u = \frac{V_1}{V_2}$$

and $$\frac{\Delta t}{\Delta x} = \frac{\sin(u+v)}{V_1}$$

where $$\frac{\Delta t}{\Delta x}$$

is the slope of said curve, $v$ is said angle of dip, and $u+v$ is the angle of emergence from the earth of seismic waves refracted from said interface.

3. A method in accordance with claim 2 wherein the seismic wave generating means is within the borehole and the seismic wave detecting means is on the surface of the earth.

4. A method in accordance with claim 2 wherein the seismic wave generating means is on the surface of the earth and the seismic wave detecting means is within the borehole.

References Cited in the file of this patent

UNITED STATES PATENTS

| | | |
|---|---|---|
| 1,923,107 | McCollum | Aug. 22, 1933 |
| 2,062,151 | Weatherby | Nov. 24, 1936 |
| 2,153,920 | Gardner | Apr. 11, 1939 |
| 2,268,130 | Slotnick | Dec. 30, 1941 |
| 2,569,411 | Ellis | Sept. 25, 1951 |

OTHER REFERENCES

Barton: "The Seismic Method of Mapping Geological Structure," Geophysical Prospecting, 1929, published by American Institute of Mining Engineers, New York, N.Y. Pages 572–624, pages 576–579, 580, 584, 585, 589 relied on. Copy in Patent Office Library.

Heiland: Geophysical Exploration, published by Prentice-Hall, Inc. New York, 1946. Pages 450–505. Copy in Patent Office Lib.

Heiland: Geophysical Exploration, publ. by Prentice-Hall, Inc., New York, 1946. Pages 506–507, 521, 522. Copy in Pat. Off. Lib. (cited in previous office action).